United States Patent
Levi et al.

(10) Patent No.: US 11,606,427 B2
(45) Date of Patent: Mar. 14, 2023

(54) SOFTWARE-CONTROLLED CLOCK SYNCHRONIZATION OF NETWORK DEVICES

(71) Applicant: MELLANOX TECHNOLOGIES, LTD., Yokneam (IL)

(72) Inventors: Dotan David Levi, Kiryat Motzkin (IL); Avraham Ganor, Shoham (IL); Arnon Sattinger, Zichron Yaakov (IL); Natan Manevich, Ramat Hasharon (IL); Reuven Kogan, Yokneam Ilit (IL); Artiom Tsur, Afula (IL); Ariel Almog, Kohav Yair (IL); Bar Shapira, Tel-Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/120,313

(22) Filed: Dec. 14, 2020

(65) Prior Publication Data
US 2022/0191275 A1     Jun. 16, 2022

(51) Int. Cl.
| | |
|---|---|
| *H04L 67/1095* | (2022.01) |
| *G06F 1/12* | (2006.01) |
| *G06F 1/14* | (2006.01) |

(52) U.S. Cl.
CPC ............ *H04L 67/1095* (2013.01); *G06F 1/12* (2013.01); *G06F 1/14* (2013.01)

(58) Field of Classification Search
CPC .......... H04L 67/1095; G06F 1/12; G06F 1/14
See application file for complete search history.

(56) References Cited

U.S. PATENT DOCUMENTS

| | | | |
|---|---|---|---|
| 5,392,421 A | 2/1995 | Lennartsson | |
| 5,402,394 A | 3/1995 | Turski | |

(Continued)

FOREIGN PATENT DOCUMENTS

| | | | |
|---|---|---|---|
| CN | 106817183 A | 6/2017 | |
| CN | 108829493 A | 11/2018 | |

(Continued)

OTHER PUBLICATIONS

IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.

(Continued)

*Primary Examiner* — Sam K Ahn
*Assistant Examiner* — Amneet Singh
(74) *Attorney, Agent, or Firm* — Kligler & Associates Patent Attorneys Ltd

(57) ABSTRACT

A synchronized communication system includes a plurality of network communication devices, one of which is designated as a root device and the others designated as slave devices. Each network communication device includes one or more ports and communications circuitry, which processes the communication signals received by the one or more ports so as to recover a respective remote clock from each of the signals. A synchronization circuit is integrated in the root device and provides a root clock signal, which is conveyed by clock links to the slave devices. A host processor selects one of the ports of one of the network communication devices to serve as a master port, finds a clock differential between the root clock signal and the respective remote clock recovered from the master port, and outputs, responsively to the clock differential, a control (Continued)

signal causing the synchronization circuit to adjust the root clock signal.

21 Claims, 4 Drawing Sheets

(56) References Cited

U.S. PATENT DOCUMENTS

| | | |
|---|---|---|
| 5,416,808 A | 5/1995 | Witsaman et al. |
| 5,491,792 A | 2/1996 | Grisham et al. |
| 5,564,285 A | 10/1996 | Jurewicz et al. |
| 5,592,486 A | 1/1997 | Lo et al. |
| 5,896,524 A | 4/1999 | Halstead, Jr. et al. |
| 6,055,246 A | 4/2000 | Jones |
| 6,084,856 A | 7/2000 | Simmons et al. |
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |
| 6,556,638 B1 | 4/2003 | Blackburn |
| 6,718,476 B1 | 4/2004 | Shima |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,341,454 B1* | 12/2012 | Kondapalli ............... G06F 1/12 713/400 |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,879,552 B2 | 11/2014 | Zheng |
| 8,930,647 B1 | 1/2015 | Smith |
| 9,344,265 B2 | 5/2016 | Karnes |
| 9,397,960 B2 | 7/2016 | Arad et al. |
| 9,549,234 B1 | 1/2017 | Mascitto |
| 9,979,998 B1 | 5/2018 | Pogue et al. |
| 10,014,937 B1 | 7/2018 | Di Mola et al. |
| 10,027,601 B2 | 7/2018 | Narkis et al. |
| 10,054,977 B2 | 8/2018 | Mikhaylov et al. |
| 10,164,759 B1 | 12/2018 | Volpe |
| 10,320,646 B2 | 6/2019 | Mirsky et al. |
| 10,637,776 B2 | 4/2020 | Iwasaki |
| 10,727,966 B1 | 7/2020 | Izenberg et al. |
| 2001/0006500 A1 | 7/2001 | Nakajima et al. |
| 2002/0027886 A1 | 3/2002 | Fischer et al. |
| 2002/0031199 A1 | 3/2002 | Rolston et al. |
| 2004/0096013 A1 | 5/2004 | Laturell et al. |
| 2004/0153907 A1 | 8/2004 | Gibart |
| 2005/0033947 A1* | 2/2005 | Morris ..................... G06F 1/14 713/1 |
| 2005/0268183 A1 | 12/2005 | Barmettler |
| 2006/0109376 A1 | 5/2006 | Chaffee et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139085 A1 | 6/2007 | Elliot et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0285597 A1 | 11/2008 | Downey et al. |
| 2009/0257458 A1* | 10/2009 | Cui ..................... H04J 3/0632 370/503 |
| 2010/0280858 A1 | 11/2010 | Bugenhagen |
| 2011/0182191 A1 | 7/2011 | Jackson |
| 2012/0076319 A1 | 3/2012 | Terwal |
| 2013/0045014 A1 | 2/2013 | Mottahedin et al. |
| 2013/0215889 A1 | 8/2013 | Zheng et al. |
| 2013/0235889 A1 | 9/2013 | Aweya et al. |
| 2013/0294144 A1 | 11/2013 | Wang et al. |
| 2013/0315265 A1 | 11/2013 | Webb, III et al. |
| 2013/0336435 A1 | 12/2013 | Akkihal et al. |
| 2014/0153680 A1 | 6/2014 | Garg et al. |
| 2014/0185632 A1 | 7/2014 | Steiner et al. |
| 2014/0253387 A1 | 9/2014 | Gunn et al. |
| 2014/0321285 A1 | 10/2014 | Chew et al. |
| 2015/0078405 A1 | 3/2015 | Roberts |
| 2015/0127978 A1 | 5/2015 | Cui et al. |
| 2015/0318941 A1 | 11/2015 | Zheng et al. |
| 2016/0072602 A1 | 3/2016 | Earl et al. |
| 2016/0110211 A1 | 4/2016 | Karnes |
| 2016/0277138 A1 | 9/2016 | Garg et al. |
| 2016/0315756 A1 | 10/2016 | Tenea et al. |
| 2017/0005903 A1 | 1/2017 | Mirsky |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0162234 A1 | 5/2020 | Almog et al. |
| 2020/0169379 A1 | 5/2020 | Gaist et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2021/0218431 A1 | 7/2021 | Narayanan et al. |
| 2021/0297230 A1 | 9/2021 | Dror et al. |
| 2021/0318978 A1 | 10/2021 | Hsung |
| 2022/0066978 A1* | 3/2022 | Mishra ................. G06F 13/4291 |

FOREIGN PATENT DOCUMENTS

| | | |
|---|---|---|
| EP | 1215559 B1 | 9/2007 |
| EP | 2770678 A1 | 8/2014 |
| JP | 2011091676 A | 5/2011 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 2014138936 A1 | 9/2014 |

OTHER PUBLICATIONS

IEEE Standard 1588™—2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.

Weibel et al., "Implementation and Performance of Time Stamping

(56) References Cited

OTHER PUBLICATIONS

Techniques", 2004 Conference on IEEE 1588, pp. 1-29, Sep. 28, 2004.
Working Draft Project American National Standard T10/1799-D, "Information Technology—SCSI Block Commands—3 (SBC-3)", pp. 1-220, Revision 19, May 29, 2009.
"Infiniband Architecture: Specification vol. 1", pp. 1-1727, Release 1.2.1, Infiniband Trade Association, Nov. 2007.
Mellanox Technologies, "Mellanox ConnectX IB: Dual-Port InfiniBand Adapter Cards with PCI Express 2.0", pp. 1-2, USA, year 2008.
Wikipedia—"Precision Time Protocol", pp. 1-8, Aug. 24, 2019.
Levi et al., U.S. Appl. No. 16/779,611, filed Feb. 2, 2020.
Weibel, H., "High Precision Clock Synchronization according to IEEE 1588 Implementation and Performance Issues", Zurich University of Applied Sciences, pp. 1-9, Jan. 17, 2005.
Lu et al., "A Fast CRC Update Implementation", Computer Engineering Laboratory, Electrical Engineering Department, pp. 113-120, Oct. 8, 2003.
Levi et al., U.S. Appl. No. 16/799,873, filed Feb. 25, 2020.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
ITU-T recommendation, "G.8273.2/Y.1368.2—Timing characteristics of telecom boundary clocks and telecom time slave clocks", pp. 1-50, Jan. 2017.
Texas Instruments, "LMK05318 Ultra-Low Jitter Network Synchronizer Clock With Two Frequency Domains," Product Folder, pp. 1-86, Dec. 2018.
Ravid et al., U.S. Appl. No. 16/920,772, filed Jul. 6, 2020.
Sela et al., U.S. Appl. No. 16/900,931, filed Jun. 14, 2020.
Sattinger et al., U.S. Appl. No. 17/191,736, filed Mar. 4, 2021.
U.S. Appl. No. 16/683,309 Office Action dated Sep. 17, 2021.
U.S. Appl. No. 16/920,722 Office Action dated Aug. 12, 2021.
IPCLOCK, "IEEE 1588 Primer," ip-clock.com, pp. 1-3, May 1, 2017 (downloaded from https://web.archive.org/web/20170501192647/http://ip-clock.com/ieee-1588-primer/).
U.S. Appl. No. 16/900,931 Office Action dated Apr. 28, 2022.
U.S. Appl. No. 16/683,309 Office Action dated Mar. 17, 2022.
U.S. Appl. No. 16/779,611 Office Action dated Mar. 17, 2022.
U.S. Appl. No. 17/191,736 Office Action dated Apr. 26, 2022.
EP Application # 21214269 Search Report dated May 2, 2022.
U.S. Appl. No. 17/148,605 Office Action dated May 17, 2022.
ITU-T Standard G.8264/Y.1364, "Distribution of timing information through packet networks", pp. 1-42, Aug. 2017.
ITU-T Standard G.8262/Y.1362, "Timing characteristics of synchronous equipment slave clock", pp. 1-44, Nov. 2018.
ITU-T Standard G.8261/Y.1361, "Timing and synchronization aspects in packet networks", pp. 1-120, Aug. 2019.
U.S. Appl. No. 17/579,630 Office Action dated Oct. 24, 2022.
U.S. Appl. No. 17/579,630 Office Action dated Jan. 12, 2023.
U.S. Appl. No. 17/191,736 Office Action dated Nov. 10, 2022.
U.S. Appl. No. 17/670,540 Office Action dated Jan. 18, 2023.
EP Application #22151451.6 Search Report dated Jun. 17, 2022.
U.S. Appl. No. 16/779,611 Office Action dated Jun. 24, 2022.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.

\* cited by examiner

SOFTWARE-CONTROLLED CLOCK SYNCHRONIZATION OF NETWORK DEVICES

FIELD OF THE INVENTION

The present invention relates generally to systems and methods for network communications, and particularly to clock synchronization of network devices.

BACKGROUND

Clock synchronization among network devices is used in many network applications, for example in applications in which a group of nodes in a network need to maintain a consistent, accurate, stable clock within the group. Another application of using a synchronized clock value is for measuring latency between devices. If the clocks are not synchronized the resulting latency measurement will be inaccurate. Synchronization requirements in many applications are extremely stringent. For example, ITU-T Recommendation G.8273.2 allows a maximum synchronization error of 30 ns among telecom boundary clocks.

Synchronous Ethernet (SyncE) is an International Telecommunication Union Telecommunication (ITU-T) Standardization Sector standard for computer networking that facilitates transfer of clock signals over the Ethernet physical layer. In particular, SyncE enables clock synchronization inside a network with respect to a master clock. Each network device, such as a switch, a network interface card (NIC), or a router, is required to recover the master clock from high-speed data received from a clock source and uses the recovered master clock for its own data transmission. In this manner, the master clock spreads throughout the network.

U.S. Pat. No. 10,778,406, whose disclosure is incorporated herein by reference, describes a technique for precise synthesized clock synchronization between network devices. In this patent, a network device includes frequency generation circuitry configured to generate a clock signal, a phase-locked loop configured to generate a local clock based on the clock signal, and a plurality of receivers configured to receive respective data streams from respective remote clock sources. Each receiver of the plurality of receivers is configured to recover a remote clock from a respective data stream. A controller is configured to identify the remote clock recovered by one of the plurality of receivers as a master clock, find a clock differential between the identified remote clock and the local clock, and provide a control signal to the frequency generation circuitry responsively to the clock differential, which causes the frequency generation circuit to adjust the clock signal so as to iteratively reduce an absolute value of the clock differential.

SUMMARY

Embodiments of the present invention that are described hereinbelow provide improved methods and devices for clock synchronization.

There is therefore provided, in accordance with an embodiment of the invention, a synchronized communication system, including a plurality of network communication devices, including one network communication device that is designated as a root device and one or more others of the network communication devices that are designated as slave devices. Each network communication device includes one or more ports, which are configured to transmit and receive respective communication signals over respective network links and communications circuitry, which is configured to process the communication signals received by the one or more ports so as to recover a respective remote clock from each of the communications signals. A synchronization circuit is integrated in the root device and is configured to provide a root clock signal to the communications circuitry in the root device. Clock links are coupled to convey the root clock signal from the root device to the slave devices so as to serve as a local clock signal for the communications circuitry in the slave devices. A host processor is coupled by control links to the network communication devices and is driven by software to select one of the ports of one of the network communication devices to serve as a master port, to find a clock differential between the root clock signal and the respective remote clock recovered from the master port, and to output, responsively to the clock differential, a control signal causing the synchronization circuit to adjust the root clock signal.

In the disclosed embodiments, the host processor is configured to select the master port from among the ports of both the root device and the slave devices.

In one embodiment, the clock links include cables interconnecting the network communication devices independently of the network links. In some embodiments, the clock links are configured to convey the root clock signal from the root device to a first one of the slave devices and from the first one of the slave devices in series to a second one of the slave devices. Additionally or alternatively, the clock links are configured to convey the root clock signal from the root device to at least first and second ones of the slave devices in parallel.

In the disclosed embodiments, the network communication devices include network interface controllers (NICs) and/or network switches. Additionally or alternatively, the system includes a peripheral component bus connecting the host processor to the network communication devices, wherein the control links are implemented on the peripheral component bus.

In some embodiments, the slave devices include respective synchronization circuits, which are configured to receive the root clock signal from the synchronization circuit of the root device and to generate the local clock signal responsively to the root clock signal. In a disclosed embodiment, the synchronization circuit includes a voltage-controlled oscillator (VCO) and is configured to adjust a voltage applied to the VCO responsively to the control signal.

There is also provided, in accordance with an embodiment of the invention, a method for synchronization, which includes connecting one or more ports in each of a plurality of network communication devices to transmit and receive respective communication signals over respective network links. The communication signals received by the one or more ports are processed so as to recover a respective remote clock from each of the communications signals. One of the network communication devices is designated as a root device and one or more others of the network communication devices as slave devices. A root clock signal is provided to communications circuitry in the root device from a synchronization circuit in the root device. The root clock signal is conveyed via clock links from the root device to the slave devices so as to serve as a local clock signal for the communications circuitry in the slave devices. A host processor is coupled via control links to the network communication devices. The host processor selects one of the ports of one of the network communication devices to serve as a master port. A clock differential is found between the root clock signal and the respective remote clock recovered from the master port. Responsively to the clock differential, a control signal is outputted, causing the synchronization circuit to adjust the root clock signal. The present invention will be more fully understood from the following detailed description of the embodiments thereof, taken together with the drawings in which:

DETAILED DESCRIPTION OF EMBODIMENTS

Overview

Figure 1:
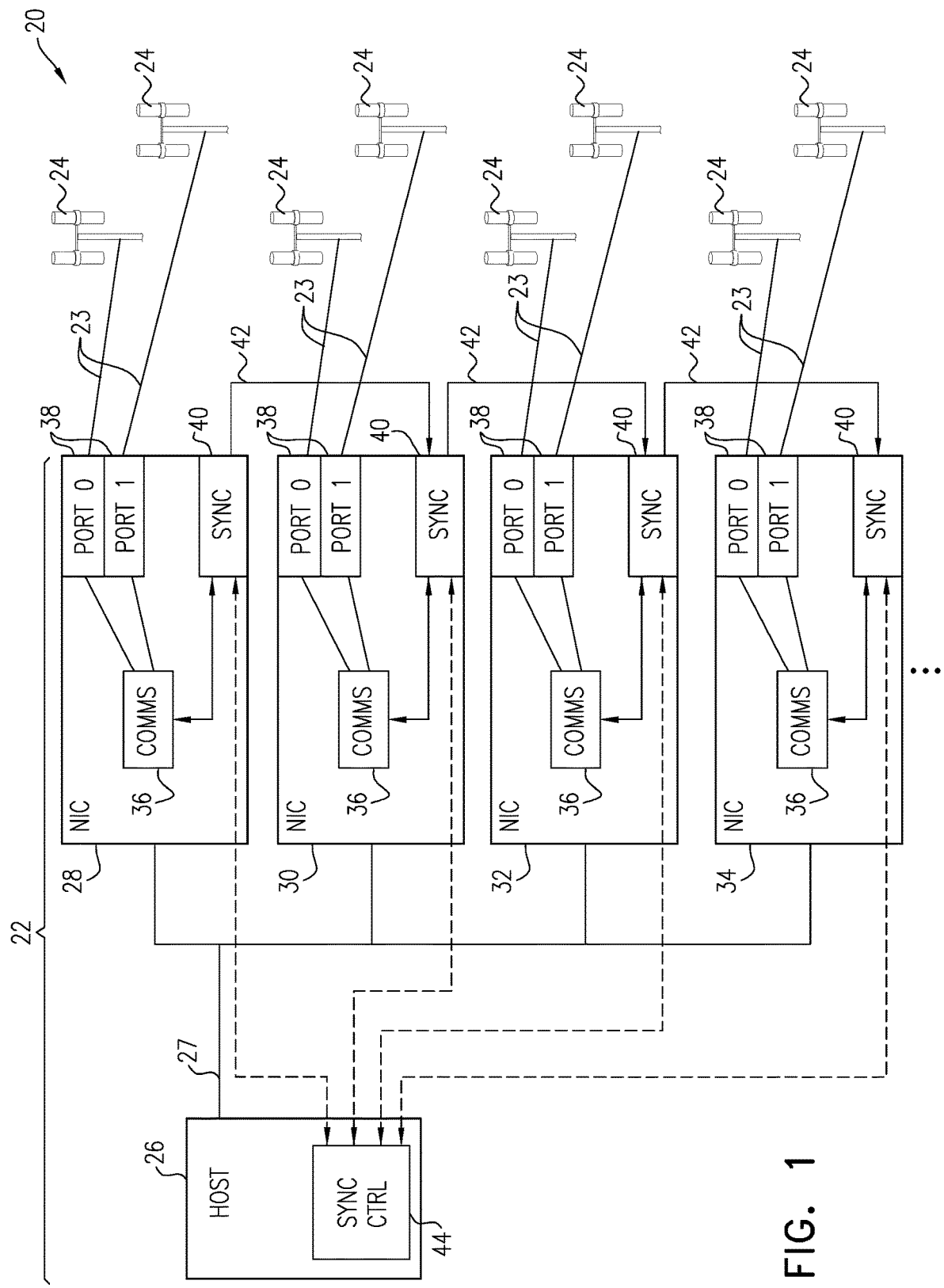
FIG. 1 is a block diagram that schematically illustrates a synchronized network communication system, in accordance with an embodiment of the invention.

In SyncE-compliant switches, all of the switch ports are precisely locked to a master clock. The above-mentioned U.S. Pat. No. 10,778,406 describes efficient methods and circuits for identifying the port that is to serve as the source of the master clock and adjusting and distributing the master clock to the other ports.

To increase the number of synchronized ports in current SyncE networks, the master clock is transmitted over the Ethernet physical layer to other switches, meaning that the same path is used for the clock as for the network data. Each additional hop along this clock/data path adds noise and latency. For this reason, the SyncE scheme cannot readily be scaled to larger networks, containing large numbers of devices and Ethernet links.

Embodiments of the present invention that are described herein address these limitations by enabling multiple, separate network devices to share the same precise root clock, which is generated by a root device under the control of synchronization software running on a host processor. The root clock is distributed over dedicated clock links, such as cable links between the network devices, rather than relying on the data network for clock distribution as in conventional SyncE installations. The clock links may be arranged in any desired topology, including clock links in series and/or in parallel, in order to serve large numbers of network devices that are located in mutual proximity. Solutions of this sort are particularly well suited, for example, for sharing a precise root clock among multiple network interface controllers (NICs) serving the same host computer, or among multiple NICs or switches on different shelves of the same rack.

The disclosed embodiments are thus directed to a synchronized communication system comprising multiple network communication devices (such as NICs or switches, for example). Each network communication device comprises one or more ports, which transmit and receive communication signals over respective network links, along with communications circuitry, which processes the communication signals received by the ports of the device so as to recover a respective remote clock from each of the received signals. One of the network communication devices is designated as the root device, while the other network communication devices are designated as slave devices. A synchronization circuit integrated in the root devices provides a precise root clock signal to the communications circuitry in the root device. This root clock signal is conveyed over clock links from the root device to the slave devices so as to serve as a local clock signal for the communications circuitry in the slave devices. Thus, all of the network communication devices are precisely synchronized with one another by means of the root clock.

A host processor, running synchronization software, is coupled by control links to the network communication devices. To synchronize the root clock with a reference clock received from the network, the host processor selects one of the ports of one of the network communication devices to serve as the master port. (The host processor may make the selection autonomously, or in response to a network management command, for example.) The master port can be selected from among the ports on any of the network communication devices and need not be on the root device. The host processor finds the clock differential between the root clock signal and the respective remote clock recovered from the master port. Based on this clock differential, the host processor outputs a control signal to the synchronization circuit in the root device, which causes the synchronization circuit to adjust the root clock signal so as to reduce the difference between the root clock signal and the remote clock recovered by the master port.

This process of clock adjustment typically continues iteratively, so that the clock differential gradually decreases, and the root clock is maintained within a small range around the reference clock. All the slave devices receive and use this precise reference clock as the source for their own local clocks. Methods and circuit elements that can be applied, mutatis mutandis, for the purpose of precisely adjusting the root clock in the synchronization circuit are described further in the above-mentioned U.S. Pat. No. 10,778,406 and in U.S. patent application Ser. No. 16/920,772, filed Jul. 6, 2020, which is assigned to the assignee of the present patent application and whose disclosure is incorporated herein by reference.

System Description

FIG. 1 is a block diagram that schematically illustrates a synchronized communication system 20, in accordance with an embodiment of the invention. System 20 in this example comprises a distribution unit (DU) 22, which communicates over network communication links 23, such as high-speed Ethernet links, with multiple radio units (RUs) 24 in a wireless telecommunications network, such as a cellular network. Such networks are subject to stringent synchronization requirements, and are thus a good example of the sort of environment in which embodiments of the present invention can be advantageously deployed. Alternatively, the principles of the present invention may be applied in other sorts of network communication systems in which precise clock control is needed, and particularly when scalability is important. Such alternative implementations and applications will be apparent to those skilled in the art after reading the present description and are considered to be within the scope of the present invention.

DU 22 comprises a host processor 26, such as a server comprising a suitable central processing unit (CPU) and memory, which is connected by control links 27 to multiple network communication devices, in this case NICs 28, 30, 32, 34, . . . . Each NIC typically comprises an integrated circuit chip or chip set on a respective circuit board. Control links 27 are implemented in this sort of unit on a peripheral component bus, such as a PCIe® bus, which connects the host processor to the NICs. Alternatively or additionally, the control link may comprise network links, such as Ethernet links. Each NIC 28, 30, 32, 34 comprises two ports 38 (labeled PORT 0 and PORT 1), which transmit and receive respective communication signals over respective network links 23 under the control of communications circuitry 36. Alternatively, each NIC or other network communication device in DU 22 may comprise a single port or three or more ports.

Communications circuitry 36 carries out network interface and control functions that are known in the art, including Ethernet physical layer (PHY) and medium access control (MAC) functions in the present example. The PHY functions include processing the communication signals received by ports 38 from network links 23 so as to recover a respective remote clock from each of the received communications signals. A synchronization circuit 40 in each NIC 28 provides a local clock signal, which is applied by communications circuitry 36 in modulating communications signals that are transmitted through the corresponding ports 38 to network links 23. The interface and control functions of communications circuitry 36 are typically implemented in digital logic circuits, which may be hard-wired or programmable. Alternatively or additionally, at least some of the functions of the communications circuitry may be performed by an embedded microprocessor or microcontroller, under the control of suitable software or firmware.

One of the network communication devices—NIC 28 in the present example—is designated as the root device for purposes of clock synchronization. The other NICs 30, 32, are designated as slave devices. Synchronization circuit 40 in the root device generates a root clock signal, under the control of synchronization control software 44, which runs on host processor 26. (Details of the circuits and process used in generating the root clock are shown in the figures that follow and are described hereinbelow with reference thereto.) Clock links 42 convey the root clock signal from the root device to the slave devices so as to serve as the local clock signal for communications circuitry 36 in the slave devices.

Typically, synchronization circuits 40 in the slave devices, such as in NICs 30, 32, 34, . . . , receive the root clock signal from the synchronization circuit of NIC 28 (the root device) and generate respective local clock signals at the same frequency as the root clock signal. Since the slave devices rely on the root clock signal in this manner, synchronization circuits 40 in the slave devices may be simple in their construction and capabilities, for example comprising a phase-locked loop (PLL) with appropriate input and output connections. Alternatively, for greater versatility and robustness in the configuration and operation of system 20, the slave devices may comprise more complex synchronization circuits, similar to those in the root device, as described below.

Clock links 42 may comprise, for example, dedicated cables or printed circuit traces, with lengths and transmission characteristics chosen to ensure that synchronization circuits 40 in the slave devices are able to synchronize their respective local clocks precisely with the root clock signal received over links 42. In the pictured example, clock links 42 connect NIC 28 to NICs 30, 32 and 34 in series. Alternatively or additionally, the clock links may be arranged so that at least some of the slave devices are connected to the root device in parallel (for example in a fan-out configuration, in which each of NICs 30, 32, 34 is connected directly by a respective clock link to synchronization circuit 40 of NIC 28).

Host processor 26 is driven by synchronization control software 44 to interact with synchronization circuits 40 and control the synchronization of NICs 28, 30, 32, 34, . . . . Software 44 may be downloaded to host processor 26 in electronic form, for example over a network. Alternatively or additionally, this software may be stored on tangible, non-transitory computer-readable media, such as optical, magnetic, or electronic memory media.

As described further hereinbelow, software 44 causes host processor 26 to select one of ports 38 of one of the NICs to serve as the master port, for example PORT 1 on NIC 30. (As noted earlier, the master port may be on any of the NICs, including both the root and slave devices, and software 44 may even cause host processor 26 to change the master port from time to time.) Communications circuitry in NIC 30 recovers a remote clock from the signal received by the master port over the respective network link 23 and reports the remote clock frequency to host processor 26. The host processor calculates a clock differential between the frequency of the root clock signal and this remote clock frequency. Alternatively, communications circuitry 36 in NIC 30 may calculate and report the clock differential to the host processor. In either case, based on this clock differential, host processor 26 outputs a control signal to synchronization circuit 40 on NIC 28 (the root device), instructing the synchronization circuit to adjust the root clock signal so as to reduce the clock differential. This process continues iteratively during the operation of system 20.

The root clock signal generated by synchronization circuit 40 in NIC 28 is thus locked precisely, with low jitter and low wander, to the remote clock recovered from the communication signals that are received at the master port. When the synchronization is implemented with sufficient precision, for example as described below, the frequency of the root clock will converge to within a few parts per billion (PPB) of the received signal clock. Consequently, NICs 28, 30, 32, 34, . . . , are able to lock their transmitted symbol rates precisely to the received symbol rate to within a few PPB, as well, in accordance with SyncE requirements.

Synchronization Circuits and Processes

Figure 2:
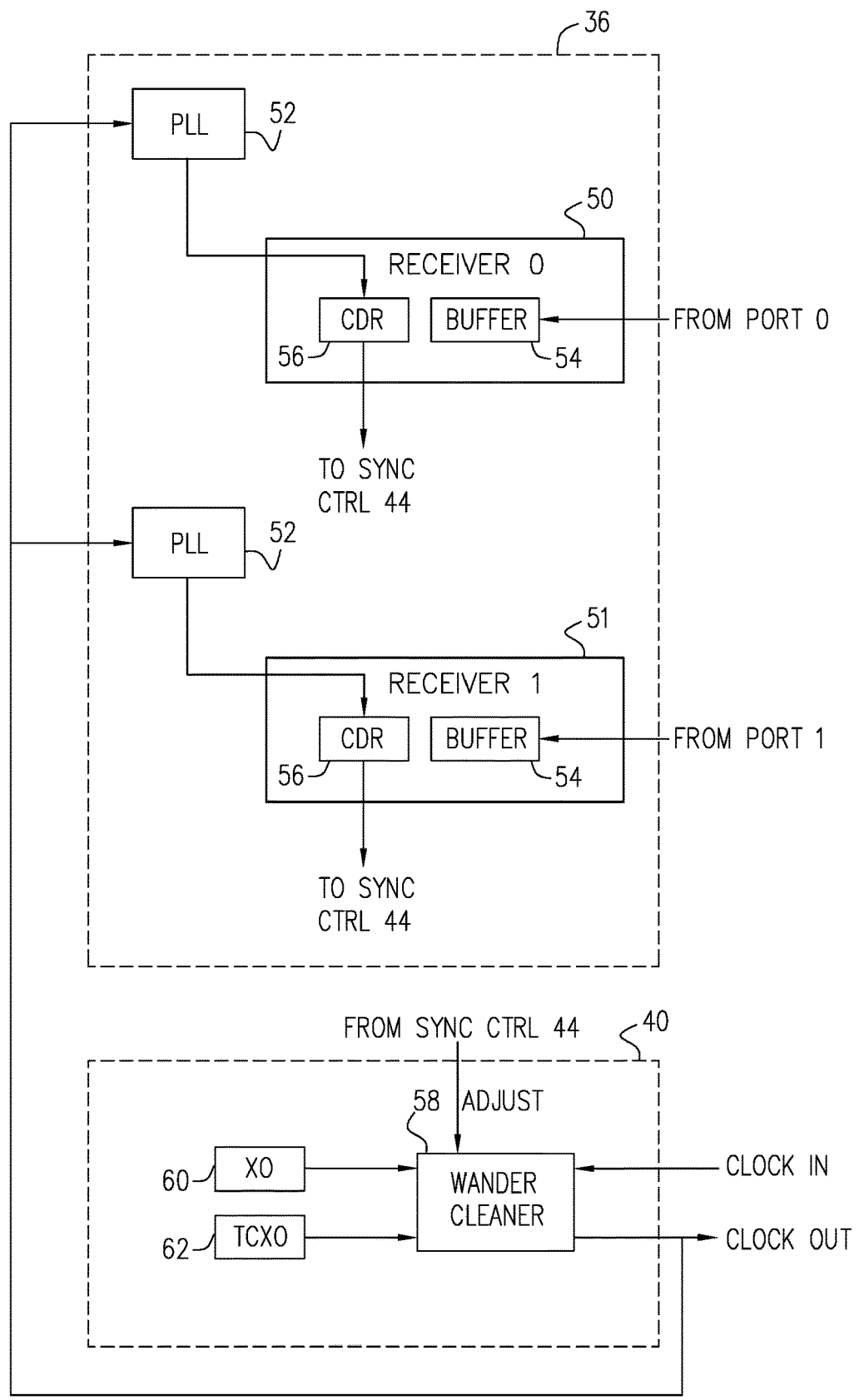
FIG. 2 is a block diagram that schematically shows details of communication and synchronization circuits in a network device, in accordance with an embodiment of the invention.

FIG. 2 is a block diagram that schematically shows details of communications circuitry 36 and synchronization circuit 40 in NIC 28, in accordance with an embodiment of the invention. The elements of communications circuitry 36 that are shown in FIG. 2 are those that are used in clock recovery and are thus common to all of NICs 28, 30, 32, 34, . . . . Because NIC 28 is the root device in the present example, synchronization circuit 40 is configured for precise clock adjustment and control. As noted earlier, slave devices, such as NICs 30, 32, 34, may have similar synchronization circuits or alternatively, their synchronization circuits may be simpler and may even be limited to PLLs 52 (shown as part of communications circuitry 36 in FIG. 2).

Communications circuitry 36 comprises two receivers 50, 51, which receive incoming communications signals via PORT 0 and PORT 1 from the respective network links 23. Receivers 50 and 51 demodulate and buffer the data carried by the signals in respective buffers 54. A clock and data recovery (CDR) circuit 56 running in each receiver 50, 51 recovers a remote clock from the received signal, for example based on transitions in the signal level. The clock recovery may be implemented based on any suitable process that is known in the art, such as a delay-locked loop or digital oversampling of the incoming signal. Receivers 50, 51 forward the data received in buffers via control links 27 to the memory of host processor 26 for further processing and forwarding.

Synchronization circuit 40 generates a clock signal (in this case the root clock signal), which it conveys to PLLs 52, as well as conveying this clock signal to other NICs 30, 32, 34 via clock links 42. Based on this clock signal, PLLs 52 generate a local clock, for example in the GHz range. CDR circuit 56 of each receiver 50, 51 outputs the recovered frequency value and/or a clock differential, which is the difference between the remote clock frequency recovered from the respective network link 23 and the local clock frequency generated by PLL 52. Communications circuitry 36 conveys the recovered frequencies or clock differentials over control links 27 to synchronization control software 44 running on host processor 26. Similar clock frequencies or differentials are computed by the receivers in the other NICs and are similarly conveyed to the host processor.

Synchronization control software 44 chooses one of ports 38 on one of the NICs as the master port and generates a control signal based on the clock differential of the corresponding receiver. The choice of the master port can be controlled by an external network management function. Alternatively or additionally, software 44 itself may choose the master port based on suitable criteria and may change the choice of master port, if appropriate, during the operation of the system. For example, the master port may be selected in response to messages indicating the clock quality or based on knowledge of the quality of the crystal oscillators driving the clock signals.

Synchronization circuit 40 in the present embodiment comprises a wander cleaner 58, which adjusts the frequency of the root clock signal in response to the control signal generated by synchronization control software 44 running on host processor 26. Wander cleaner 58 may advantageously comprise a voltage-controlled oscillator (VCO) with a voltage controller that adjusts the voltage applied to the VCO in response to the control signal from software 44. The voltage adjustment may be positive or negative, depending on the sign of the clock differential computed at the master port, and may be applied in very fine steps, for example on the order of 1 part per billion (PPB) of the clock frequency, or even less. In one embodiment, wander cleaner 58 comprises an Ultra-Low Jitter Network Synchronizer Clock LMK05318, available from Texas Instruments Inc. (Dallas, Tex.), which uses VCO technology to generate a precise, stable output clock. This component has inputs for two different clocks, including a crystal oscillator (XO) 60 as its main frequency source and a temperature-controlled crystal oscillator (TCXO) 62 as a reference frequency source. It is capable of locking the root clock signal to the reference frequency received from the master port to within a few PPB.

Alternatively, synchronization circuit 40 may comprise other types of frequency generation circuits, as are known in the art. For example, synchronization circuit may comprise an oscillator with clock switching circuitry and a frequency mixer and PLL. As another example, synchronization circuit 40 may comprise an analog or digital frequency synthesizer, based on a VCO or other frequency synthesis component. Further details of these sorts of frequency generation circuits are presented in the above-mentioned U.S. Pat. No. 10,778,406 and in U.S. patent application Ser. No. 16/920,772.

Figure 3:
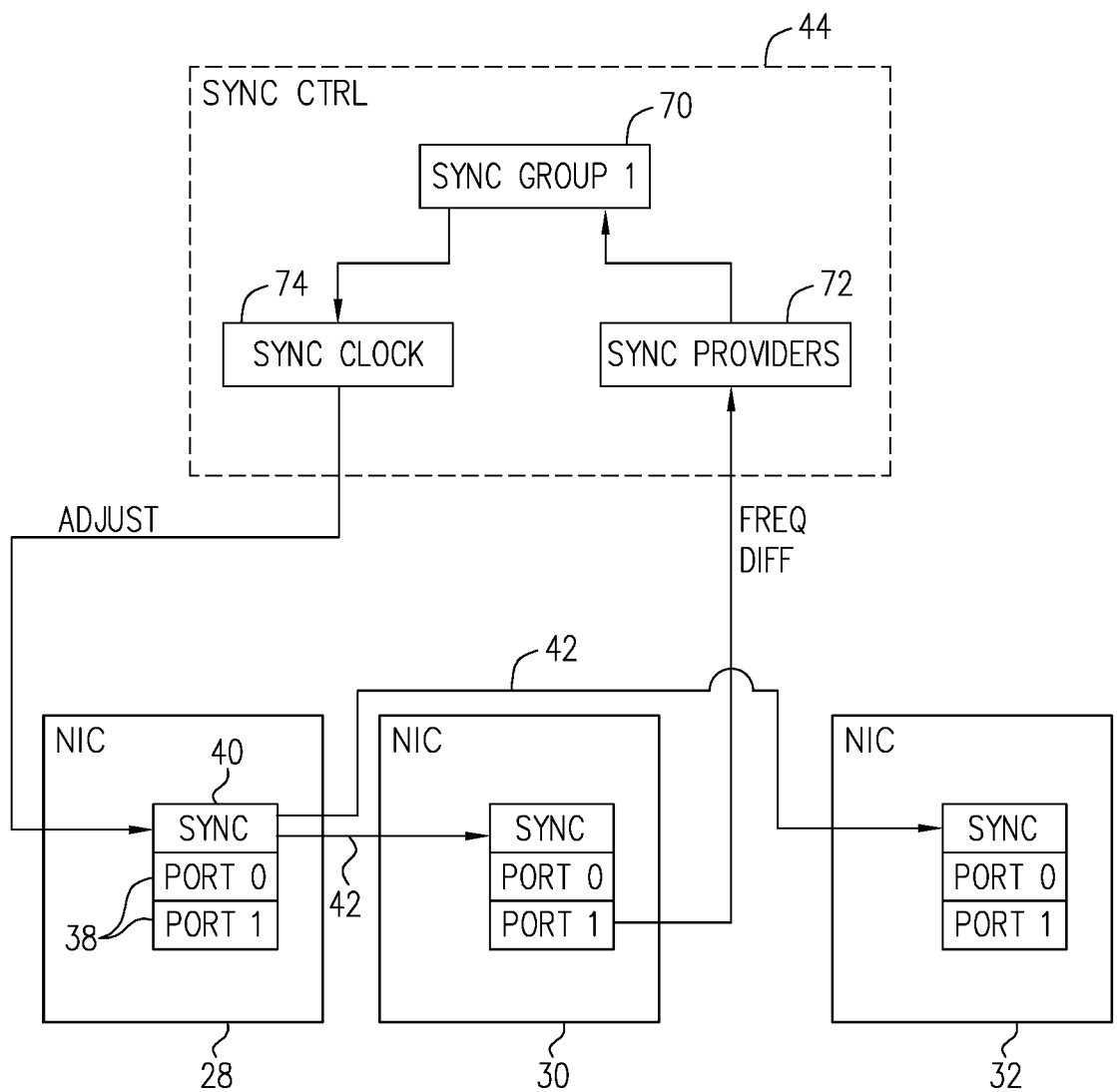
FIG. 3 is a block diagram that schematically shows details of software and circuits for clock synchronization in a network communication system, in accordance with an embodiment of the invention.
Figure 4:
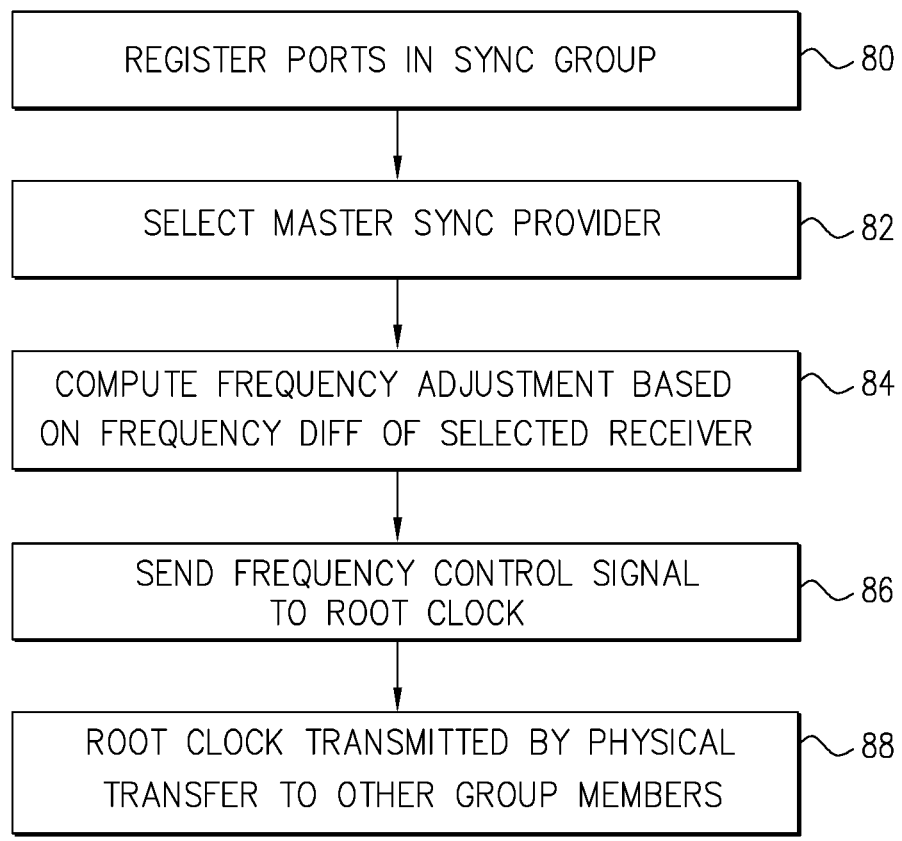
FIG. 4 is a flow chart that schematically illustrates a method for clock synchronization, in accordance with an embodiment of the invention.

Reference is now made to FIGS. 3 and 4, which schematically illustrate a method for clock synchronization in system, 20, in accordance with an embodiment of the invention. FIG. 3 is a block diagram showing details of synchronization control software 44 and its interaction with NICs 28, 30 and 32 in the clock synchronization process, while FIG. 4 is a flow chart showing steps in the method. In this example, NIC 28 is the root device and is connected by parallel clock links 42 to NICs 30 and 32. PORT 1 of NIC 30 has been selected as the master port.

As shown in FIG. 3, synchronization control software 44 assigns all the NICs 28, 30, 32 that share the same root clock to a synchronization group 70. Software 44 running on host processor 26 may assign all of the NICs (or other network devices) that are connected to the host processor to be in the same synchronization group, or it may alternatively manage multiple groups, each with its own root clock.

Within each such group 70, NICs 28, 30, 32 register their respective ports 38 as synchronization providers 72, at a registration step 80 (FIG. 4). NIC 28 is registered as the source of the root clock for the group. Software 44 selects the master synchronization provider, i.e., the master port (PORT 1 of NIC 30), at a master selection step 82. NIC 30 measures the clock frequency of the received communication signal on PORT 1, as explained above, and communicates the frequency (or the frequency differential relative to the root clock) to software 44.

Based on the frequency differential, software 44 computes a frequency adjustment to be applied to the root clock, at a frequency computation step 84. The adjustment may be positive or negative, as noted earlier, and it may be applied gradually, in iterative steps, as described in U.S. patent application Ser. No. 16/920,772. Software 44 drives host processor 26 to generate and convey a frequency control signal to NIC 28, at a clock synchronization step 86. This frequency control signal may take the form, for example, of a clock synchronization command 74, which is transmitted via control link 27 to NIC 28. Synchronization circuit 40 in NIC 28 adjusts the root clock accordingly. The root clock is transmitted continuously by physical transfer over clock links 42 to NICs 30 and 32, in a clock transfer step 88.

Although the embodiments described above relate, for the sake of concreteness and clarity, to a particular type of network and system configuration, the principles of the present invention may similarly be implemented in other hardware and software environments, in order to precisely synchronize communications not only of NICs, but also switches and other network devices. All such alternative applications and implementations are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A synchronized communication system, comprising:
   a plurality of network communication devices, including one network communication device that is designated as a root device and one or more others of the network communication devices that are designated as slave devices, each network communication device comprising:

one or more ports, which are configured to transmit and receive respective communication signals over respective network links of a packet communication network; and communications circuitry, which is configured to process the communication signals received by the one or more ports so as to recover a respective remote clock from data received from the packet communication network in each of the communications signals;

a synchronization circuit, which is integrated in the root device and is configured to provide a root clock signal to the communications circuitry in the root device;

clock links coupled to convey the root clock signal from the root device to the slave devices so as to serve as a local clock signal for the communications circuitry in the slave devices; and a host processor, which is coupled by control links to the network communication devices and is driven by software to select one of the ports of one of the network communication devices to serve as a master port, to find a clock differential between the root clock signal and the respective remote clock recovered from the data received from the packet communication network by the master port, and to output, responsively to the clock differential, a control signal causing the synchronization circuit to adjust the root clock signal.

2. The system according to claim 1, wherein the host processor is configured to select the master port from among the ports of both the root device and the slave devices.

3. The system according to claim 1, wherein the clock links comprise cables interconnecting the network communication devices independently of the network links.

4. The system according to claim 1, wherein the clock links are configured to convey the root clock signal from the root device to a first one of the slave devices and from the first one of the slave devices in series to a second one of the slave devices.

5. The system according to claim 4, wherein the clock links are configured to convey the root clock signal from the root device to all the slave devices in series.

6. The system according to claim 1, wherein the clock links are configured to convey the root clock signal from the root device to at least first and second ones of the slave devices in parallel.

7. The system according to claim 1, wherein the network communication devices comprise network interface controllers (NICs).

8. The system according to claim 1, wherein the network communication devices comprise network switches.

9. The system according to claim 1, and comprising a peripheral component bus connecting the host processor to the network communication devices, wherein the control links are implemented on the peripheral component bus.

10. The system according to claim 1, wherein the slave devices comprise respective synchronization circuits, which are configured to receive the root clock signal from the synchronization circuit of the root device and to generate the local clock signal responsively to the root clock signal.

11. The system according to claim 1, wherein the synchronization circuit comprises a voltage-controlled oscillator (VCO) and is configured to adjust a voltage applied to the VCO responsively to the control signal.

12. A method for synchronization, comprising:

connecting one or more ports in each of a plurality of network communication devices to transmit and receive respective communication signals over respective network links of a packet communication network;

processing the communication signals received by the one or more ports so as to recover a respective remote clock from data received from the packet communication network in each of the communications signals;

designating one of the network communication devices as a root device and one or more others of the network communication devices as slave devices;

providing a root clock signal to communications circuitry in the root device from a synchronization circuit in the root device;

conveying the root clock signal via clock links from the root device to the slave devices so as to serve as a local clock signal for the communications circuitry in the slave devices;

coupling a host processor via control links to the network communication devices;

selecting, by the host processor, one of the ports of one of the network communication devices to serve as a master port;

finding a clock differential between the root clock signal and the respective remote clock recovered from the data received from the packet communication network by the master port; and outputting, responsively to the clock differential, a control signal causing the synchronization circuit to adjust the root clock signal.

13. The method according to claim 12, wherein the host processor is configured to select the master port from among the ports of both the root device and the slave devices.

14. The method according to claim 12, wherein the clock links comprise cables interconnecting the network communication devices independently of the network links.

15. The method according to claim 12, wherein conveying the root clock signal comprises transmitting the root clock signal from the root device to a first one of the slave devices and from the first one of the slave devices in series to a second one of the slave devices.

16. The method according to claim 12, wherein conveying the root clock signal comprises transmitting the root clock signal from the root device to at least first and second ones of the slave devices in parallel.

17. The method according to claim 12, wherein the network communication devices comprise network interface controllers (NICs).

18. The method according to claim 12, wherein the network communication devices comprise network switches.

19. The method according to claim 12, wherein the control links are implemented on a peripheral component bus.

20. The method according to claim 12, wherein the slave devices comprise respective synchronization circuits, and the method comprises receiving the root clock signal from the synchronization circuit of the root device in the slave devices and generating the local clock signal in the respective synchronization circuits of the slave devices responsively to the root clock signal.

21. The method according to claim 12, wherein the synchronization circuit comprises a voltage-controlled oscillator (VCO), and providing the root clock signal comprises adjusting a voltage applied to the VCO responsively to the control signal.

* * * * *